(12) United States Patent
Andersson et al.

(10) Patent No.: US 9,143,186 B2
(45) Date of Patent: Sep. 22, 2015

(54) TRANSCEIVER AND COMMUNICATION DEVICE

(71) Applicant: Telefonaktiebolaget LM Ericsson (publ), Stockholm (SE)

(72) Inventors: Stefan Andersson, Lund (SE); Imad ud Din, Lund (SE); Henrik Sjöland, Löddeköpinge (SE); Tobias Tired, Lund (SE); Johan Wernehag, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 146 days.

(21) Appl. No.: 13/751,939

(22) Filed: Jan. 28, 2013

(65) Prior Publication Data

US 2013/0194978 A1   Aug. 1, 2013

Related U.S. Application Data

(60) Provisional application No. 61/595,434, filed on Feb. 6, 2012.

(30) Foreign Application Priority Data

Jan. 30, 2012   (EP) .................................... 12153001

(51) Int. Cl.
*H04B 3/20* (2006.01)
*H04B 1/50* (2006.01)
(Continued)

(52) U.S. Cl.
CPC ................. *H04B 1/50* (2013.01); *H04B 1/525* (2013.01); *H04L 5/1461* (2013.01); *H04B 1/0475* (2013.01)

(58) Field of Classification Search
None
See application file for complete search history.

(56) References Cited

U.S. PATENT DOCUMENTS

2005/0035824 A1   2/2005   Kearns et al.
2005/0046585 A1*  3/2005   Dodge ....................... 340/853.3
(Continued)

FOREIGN PATENT DOCUMENTS

EP        2296286 A2    3/2011
WO   2009080878 A1    7/2009

OTHER PUBLICATIONS

Mikhemar, M. et al., "A Tunable Integrated Duplexer with 50dB Isolation in 40nm CMOS", IEEE International Solid-State Circuits Conference—Digest of Technical Papers, ISSCC 2009, Feb. 8-12, 2009, pp. 386-387.

(Continued)

*Primary Examiner* — Khoa Huynh
(74) *Attorney, Agent, or Firm* — Murphy, Bilak & Homiller, PLLC

(57) ABSTRACT

A transceiver comprises a receiver, a transmitter, a signal transmission arrangement, a first signal transferring element, and a transformer having magnetically-connected first and second windings. The first signal transferring element is between the transmitter output and the signal transmission arrangement, which is arranged to transmit signals from the transmitter and to receive signals and provide them to the receiver. The first winding of the transformer is connected in parallel with the first signal transferring element, which has input and output impedances so that signals from the transmitter output reach the signal transmission arrangement, while signals from the signal transmission arrangement do not reach the transmitter output. As such, the first signal transferring element is arranged to transfer signals from the transmitter to the signal transmission arrangement such that the transmitter contribution to the signal in the first winding is suppressed.

16 Claims, 3 Drawing Sheets

(51) Int. Cl.
*H04L 5/14* (2006.01)
*H04B 1/525* (2015.01)
*H04B 1/04* (2006.01)

(56) References Cited

U.S. PATENT DOCUMENTS

2007/0207747 A1 9/2007 Johnson et al.
2011/0158134 A1 6/2011 Mikhemar et al.
2011/0299433 A1 12/2011 Darabi et al.

OTHER PUBLICATIONS

Mikhemar, M. et al., "An On-Chip Wideband and Low-Loss Duplexer for 3G/4G CMOS Radios", 2010 IEEE Symposium on VLSI Circuits (VLSIC), Jun. 16-18, 2010, pp. 129-130.
Pursula, P. et al., "Hybrid Transformer-Based Adaptive RF Front End for UHF RFID Mobile Phone Readers", 2008 IEEE International Conference on RFID, 1C1.4, The Venetian, Las Vegas, Nevada, USA, Apr. 16-17, 2008, pp. 150-155.

* cited by examiner

TRANSCEIVER AND COMMUNICATION DEVICE

TECHNICAL FIELD

The present invention generally relates to a transceiver, a method of operating the transceiver, and a computer program for implementing the method. The present invention also relates to a communication device capable of frequency division duplex communication comprising such a transceiver.

BACKGROUND

Transceivers comprise both a transmitter and a receiver, and are commonly used in a variety of communication apparatuses. Transceivers can be arranged to be operated in semi-duplex, i.e. the receiver and transmitter operates separated in time to prevent the transmitter signal from concealing the received signal. This approach is therefore commonly referred to as time division duplex (TDD). Transceivers can also be operated in full duplex, i.e. the receiver and transmitter operates simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) energy from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed. However, here it can be seen that transmission energy is lost in heat dissipation in the dummy load.

It is therefore a desire to provide an approach for transceivers where the above discussed drawbacks are reduced.

SUMMARY

An object of the invention is to at least alleviate the above stated problem. The present invention is based on the understanding that by matching a signal transferring element for connecting the transmitter to the signal transmission arrangement and a circuit path parallel thereto which includes the primary winding of a transformer to provide received signals to the receiver, the voltage of transmit signals across the primary winding will be zero or as close to zero as the quality of the implementation allows. Thus, the contribution from the transmitter at the input of the receiver will be suppressed accordingly.

According to a first aspect, there is provided a transceiver comprising a transmitter, a receiver and a signal transmission arrangement. The signal transmission arrangement is arranged to transmit signals provided from the transmitter, and arranged to receive signals and provide them to the receiver. The transceiver further comprises a first signal transferring element arranged between the transmitter output and the signal transmission arrangement, wherein the first signal transferring element is arranged to enable a signal from the output of the transmitter to reach the signal transmission arrangement through the first signal transferring element, and prevent a signal at reception frequency from the signal transmission arrangement to reach the output of the transmitter through the first signal transferring element. The transceiver further comprises a transformer comprising a first winding and a second winding being mutually magnetically connected, wherein the first winding is electrically connected in a circuit path which is connected in parallel to the first signal transferring element, and the second winding is connected to an input of the receiver. The first signal transferring element is arranged to transfer signals from the transmitter to the signal transmission arrangement such that a transmitter contribution in the first winding is suppressed.

The first signal transferring element may comprise an amplifier having a gain and phase shift that is matched to a gain and phase shift of the circuit path at the transmitter frequency such that a voltage contribution from the transmitter is equal at both sides of the first winding. Alternatively, the first signal transferring element may comprise a filter having an attenuation and phase shift that is matched to an attenuation and phase shift of the circuit path at transmitter frequency such that a voltage contribution from the transmitter is equal at both sides of the first winding. Further alternatively, the first signal transferring element may comprise an isolator having an attenuation and phase shift that is matched to an attenuation and phase shift of the circuit path at transmitter frequency such that a voltage contribution from the transmitter is equal at both sides of the first winding. The first signal transferring element may comprise an element having two or more of the abovementioned functions having an attenuation and phase shift that is matched to an attenuation and phase shift of the circuit path at transmitter frequency such that a voltage contribution from the transmitter is equal at both sides of the first winding.

The transceiver may further comprise a first controller arranged to control the gain or attenuation of the first signal transferring element such that the first signal transferring element and the circuit path have equal gain or attenuation impact on signals from the transmitter.

The first signal transferring element and the circuit path may have equal phase impact on signals from the transmitter. The circuit path may consist of the first winding and a second signal transferring element. The transceiver may further comprise a first controller arranged to control the phase shift of the second signal transferring element such that the first signal transferring element and the circuit path have equal phase impact on signals from the transmitter. The second signal transferring element may be connected between the first winding and the output of the transmitter. The second signal transferring element may be a galvanic connection.

The transceiver may further comprise a measurement circuit arranged to measure a signal significant for transmitter contribution in the first winding, wherein the first controller may comprise a feedback circuit arranged to perform the control based on the measured signal. The measurement circuit may be arranged to measure the significant signal as a voltage across the first winding. Alternatively, the measurement circuit may be arranged to measure the significant signal as transmitter leakage signal at the input of the receiver.

The first signal transferring element may be tuneable based on changes in impedance of the signal transmission arrangement.

The first signal transfer element may be any of a filter, amplifier, isolator and circulator.

According to a second aspect, there is provided a communication device, capable of frequency division duplex communication in a communication network, comprising a transceiver according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

The approach herein is based on the principle that a primary winding of a transformer arranged to couple e.g. an antenna signal of a transceiver to the receiver part is connected such that a transmitter signal across the primary winding is kept to unity gain, wherein the contribution from the transmitter to the receiver is zero. This can be made either by connecting the primary winding in parallel to an element of the transmitter path, which element is kept at unity gain, or by connecting the primary winding and a further element in series, and the series coupling is connected in parallel to the element of the transmitter path, wherein the difference from unity gain in the element of the transmitter path is compensated by gain of the further element. The same principle as mentioned for gain here is also applicable for attenuation. Due to the unity gain, the voltage at any moment emanating from the transmitter across the primary winding is always zero, and thus no contribution of the transmit signal is made to the signal being transformed and fed to the input of the receiver. The element in the transmit path can for example be a power amplifier, filter or isolator. A signal received by the antenna on the other hand provides its contribution to the primary winding and will be coupled to the receiver input. By the approach, there is no need for a duplexer or a dummy load, and the drawbacks of these components are avoided.

Figure 3:
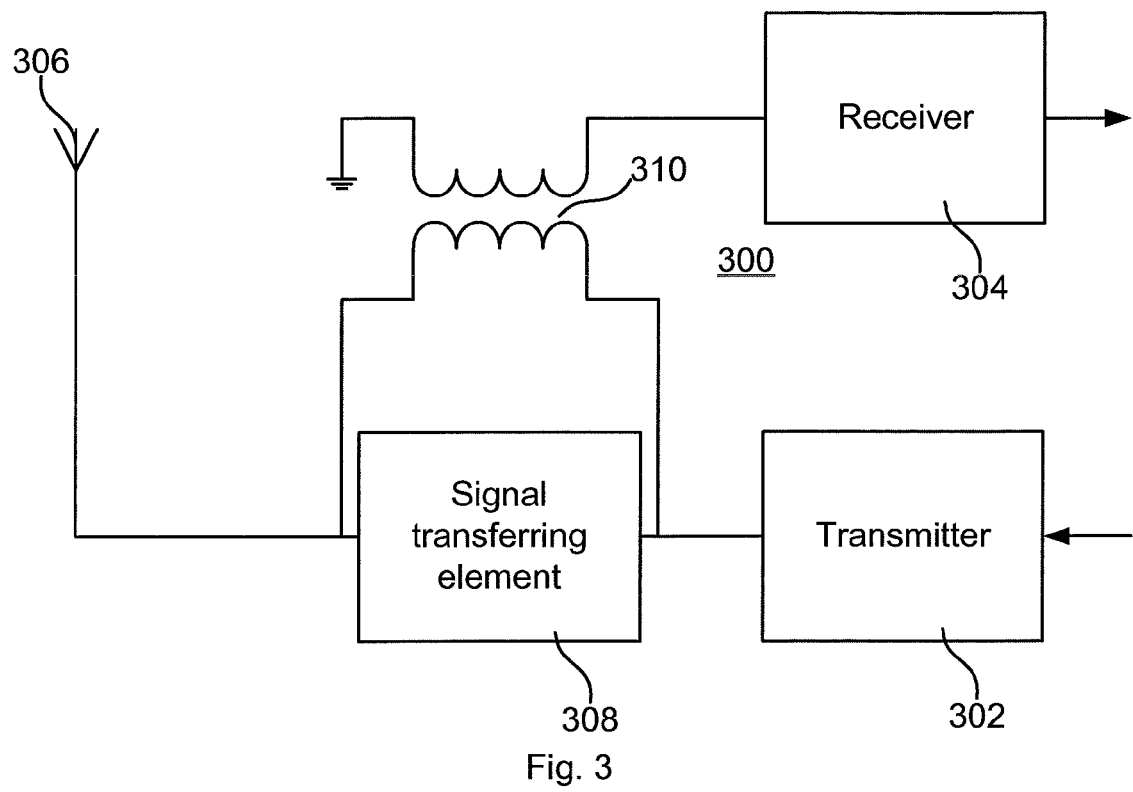
FIG. 3 is a block diagram which schematically illustrates a transceiver according to an embodiment.

FIG. 3 is a block diagram which schematically illustrates a transceiver 300 according to an embodiment. The transceiver comprises a transmitter 302, a receiver 304 and a signal transmission arrangement 306, such as the depicted antenna arrangement, or a wired connection. The transmitter 302 is connected to the antenna arrangement 306 via a first signal transferring element 308, which for example can be a power amplifier, filter or isolator. The first signal transferring element 308 should have properties such that signals from the antenna arrangement 306 are disabled, i.e. highly attenuated, from reaching the transmitter 302, while signals from the transmitter 302 should be enabled to reach the antenna arrangement 306.

Figure 1:
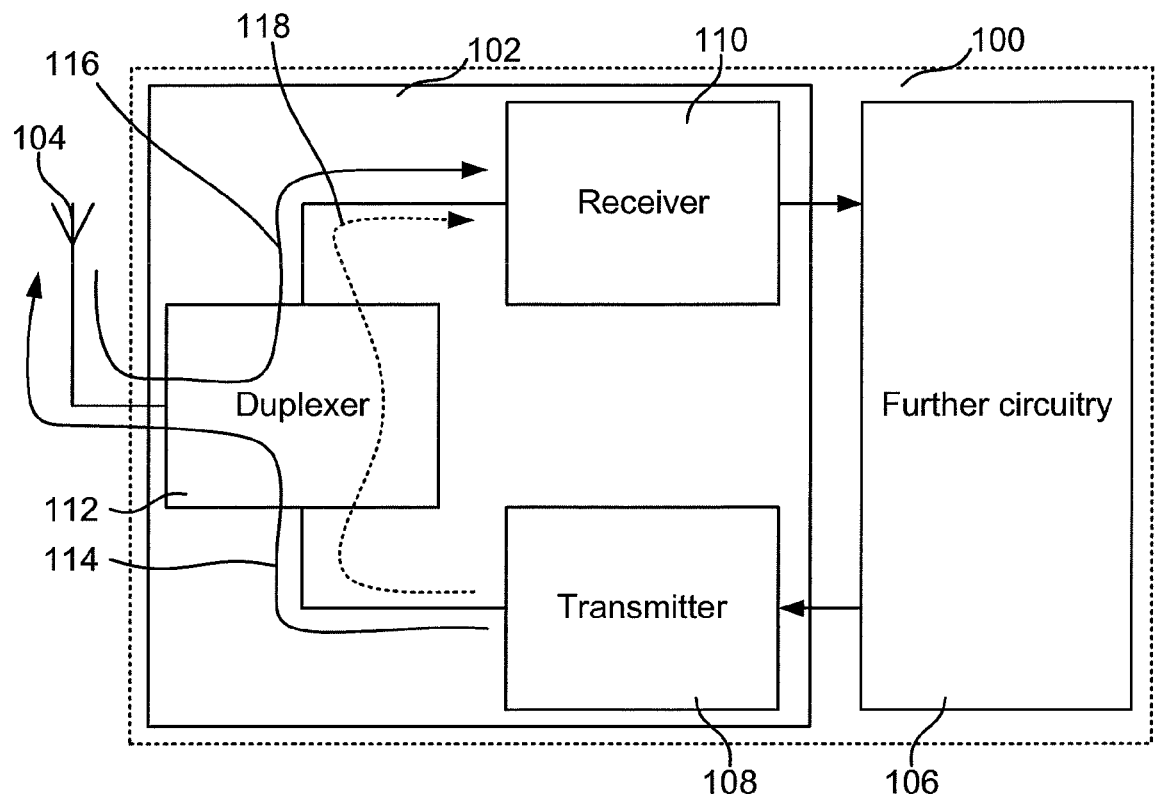
FIG. 1 is a block diagram which schematically illustrates a conventional communication apparatus comprising a transceiver.
Figure 2:
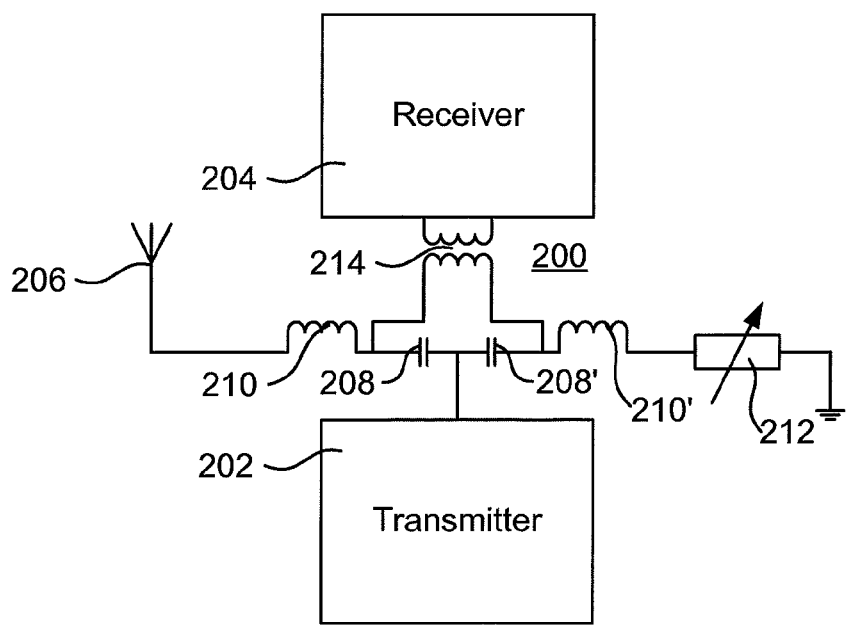
FIG. 2 is a schematic circuit diagram which illustrates a FDD transceiver arrangement without duplexer and based on electrical balance.

The transceiver further comprises a transformer 310 where a primary winding is connected in parallel with the first signal transferring element 308, and the secondary winding is connected to the input of the receiver 304. In FIG. 3, a single-ended configuration of the receiver 304 is illustrated, but the secondary winding can be connected in a differential way to the receiver as well, e.g. as depicted in FIG. 2.

The gain, or attenuation, of the first signal transferring element 308 is kept to unity, either by design, or by control means, wherein the contribution of the transmit signal over the primary winding becomes zero. Here, "unity" should be construed in its technical context where gain or attenuation of the primary winding is considered as unity too. In practice, the first transferring element 308 and the circuit path from the transmitter to the antenna via the primary winding should have equal gain/attenuation such that voltage of a transmitter signal across the primary winding is zero or as close to zero as technically feasible by the implementation.

Of course, components are not ideal, but even with this consideration, the contribution is kept low and an advantageous isolation of the transmit signal from the receiver input is achieved. When considering control means, this will be further elucidated with reference to the embodiment illustrated in FIG. 4, but is also applicable to the embodiment of FIG. 3 in sense of the options for measuring signals for a feedback structure of controlling, and in sense of controlling the first signal transferring element.

Figure 4:
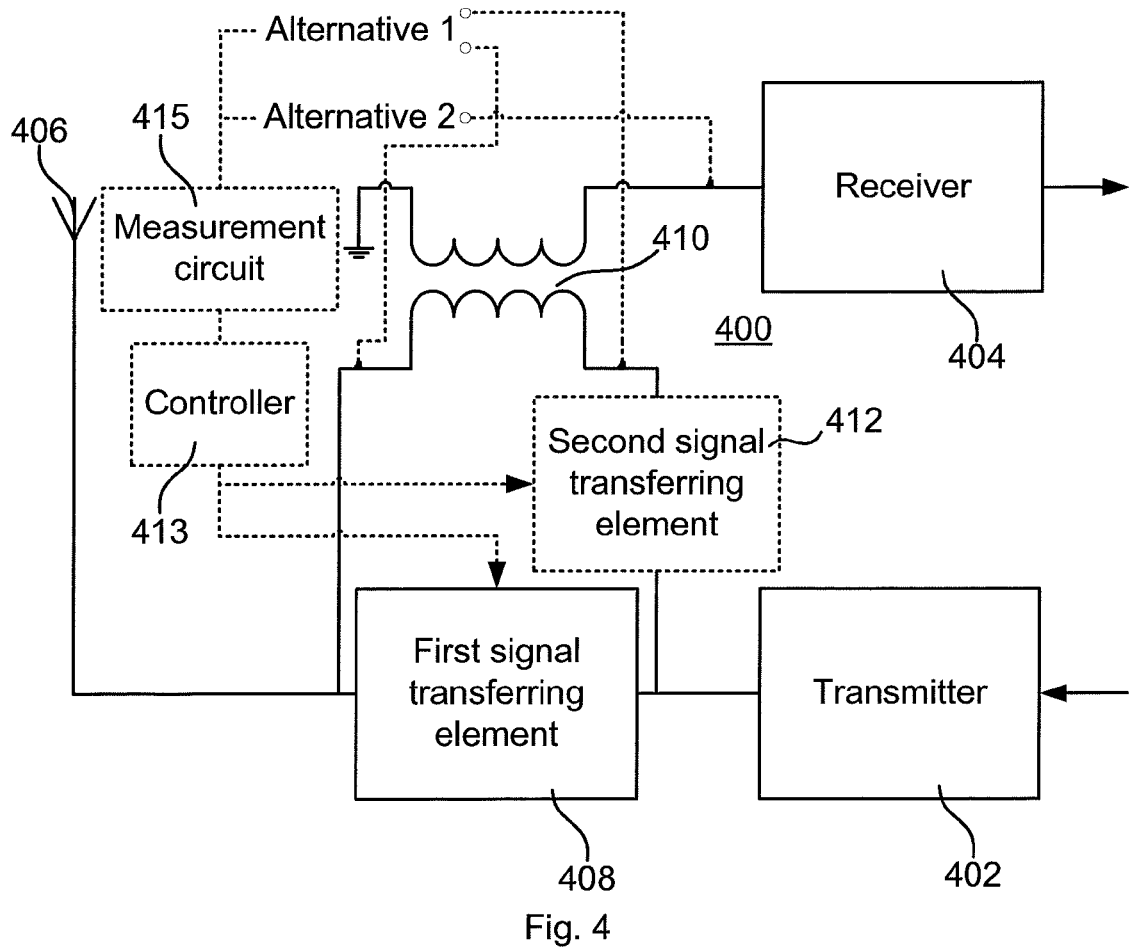
FIG. 4 is a block diagram which schematically illustrates a transceiver according to an embodiment.

FIG. 4 is a block diagram which schematically illustrates a transceiver 400 according to an embodiment. The transceiver comprises a transmitter 402, a receiver 404 and an antenna arrangement 406. The transmitter 402 is connected to the antenna arrangement 406 via a first signal transferring element 408, which for example can be a power amplifier, filter or isolator. The first signal transferring element 408 should have properties such that signals at reception frequency from the antenna arrangement 406 are disabled, i.e. highly attenuated, from reaching the transmitter 402, while signals from the transmitter 402 should be enabled to reach the antenna arrangement 406. The transceiver further comprises a transformer 410 where a primary winding is connected in series with a second signal transferring element 412 and a circuit path consisting of the series connection of the primary winding and the second signal transferring element 412 is connected in parallel with the first signal transferring element 408, and the secondary winding is connected to the input of the receiver 404. In FIG. 4, a single-ended configuration of the receiver 404 is illustrated, but the secondary winding can be connected in a differential way to the receiver as well, e.g. as depicted in FIG. 2.

The gain, or attenuation, across the primary winding is kept to unity by mutually matching the first and second signal transferring elements 408, 412, either by design, or by optional control means 413, wherein the contribution of the transmit signal over the primary winding becomes zero. Of course, components are not ideal, but even with this consideration, the contribution is kept low and an advantageous isolation of the transmit signal from the receiver input is achieved. The control means 413 can be an analog or digital control circuit which either controls the second signal transferring element 412 to match the first signal transferring element 408, or controls both the signal transferring elements 408, 412. The latter approach can have advantages for matching the transmit path to changes for example in antenna impedance and/or used frequency band. The control can be made by using a feedback structure where significant signals for the suppression feature, i.e. between the transmitter 402 and the receiver 404, are measured. This can be made by a measurement circuit 415. The measurement circuit 415 can for example measure transmitter contribution across the primary winding, as indicated as "Alternative 1" in FIG. 4. Another example is to measure the contribution at the receiver input, as indicated as "Alternative 2" in FIG. 4. The control can also be made based on knowledge about current operating conditions for the first signal transferring element 408, and, for example, a look-up table can be used for setting the parameters for the second signal transferring element 412, e.g. based on frequency band, transmit signal level, etc.

The transceiver according to the different embodiments and variants demonstrated above are particularly suitable for a communication device capable of frequency division duplex communication in a cellular communication network. The communication device can for example be a user device such as a cell-phone, a network adapter or card for a computer, or a device arranged for machine-to-machine communication. The communication device can be a wireless communication device such as a radio station capable of duplex communication or a cellular communication device, such as a mobile phone, cellular communication card, or Wide Area Network communication device, or a communication device for wired communication, such as a cable modem, a repeater device, or a wired network node. For the case of a wired solution, the antenna arrangement depicted for the transceivers in FIGS. 3 and 4 is substituted with the wired connection.

Figure 5:
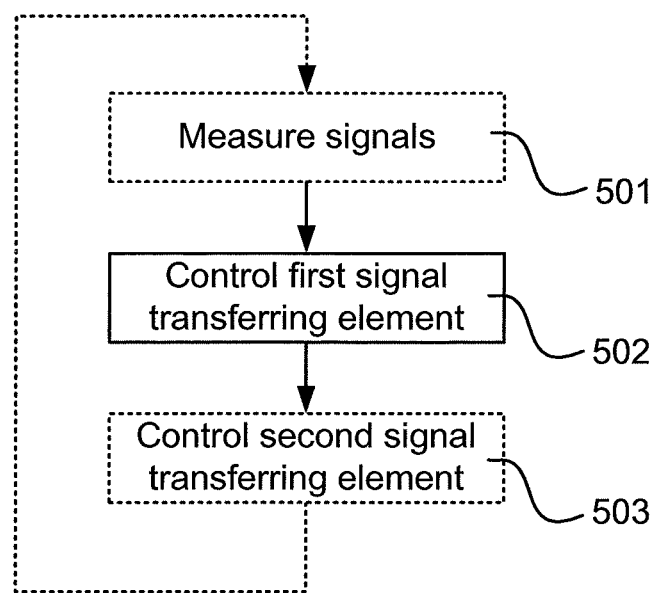
FIG. 5 is a flow chart which schematically illustrates a method according to embodiments.

A method for controlling the signal transferring element(s) of the transceiver is also suggested. FIG. 5 is a flow chart illustrating a method according to embodiments. Although the illustration is illustrated as a number of steps, the nature of the method is different since the control procedure is preferably performed on real-time basis. The method comprises controlling 502 a first signal transferring element, optionally controlling 503 a second signal transferring element. Further optionally, signals are measured 501, for example according to those alternatives illustrated in FIG. 4 and discussed in connection therewith.

Figure 6:
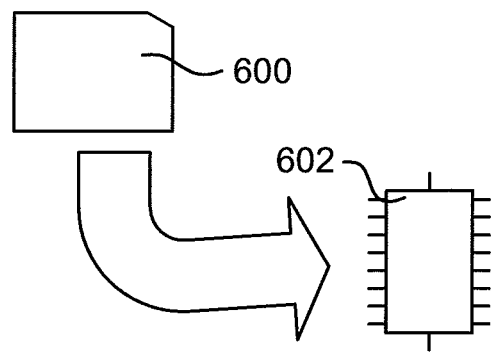
FIG. 6 schematically illustrates a computer program and a processor.

The methods according to the present invention is suitable for implementation with aid of processing means, such as computers and/or processors, especially for the case where the controller demonstrated above is a digital signal processor. Therefore, there is provided computer programs, comprising instructions arranged to cause the processing means, processor, or computer to perform the steps of any of the methods according to any of the embodiments described with reference to FIG. 5. The computer programs preferably comprises program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIG. 5. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements. A particular advantage of the computer program is that the control approach can be applied in a flexible way when using a transceiver in different applications, and/or changing application of a transceiver. The flexible nature of the control in this disclosure makes this particularly advantageous. The new control approach is then applied as a software update.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A transceiver comprising:
a transmitter;
a receiver;
a signal transmission arrangement that is arranged to transmit signals provided from the transmitter, and arranged to receive signals and provide them to the receiver;
a first signal transferring element arranged between the transmitter output and the signal transmission arrangement, wherein the first signal transferring element is arranged to:
  enable a signal from the output of the transmitter to reach the signal transmission arrangement through the first signal transferring element; and
  prevent a signal at reception frequency from the signal transmission arrangement to reach the output of the transmitter through the first signal transferring element;
a transformer comprising a first winding and a second winding being mutually magnetically connected, wherein the first winding is electrically connected in a circuit path which is connected in parallel to the first signal transferring element, and the second winding is connected to an input of the receiver;
a first controller arranged to control a gain or attenuation of the first signal transferring element such that the first signal transferring element and the circuit path have equal gain or attenuation impact on signals from the transmitter; and a measurement circuit arranged to measure a signal significant for a voltage contribution from the transmitter in the first winding, wherein the first controller comprises a feedback circuit arranged to perform the control based on the measured signal such that the first signal transferring element transfers signals from the transmitter to the signal transmission arrangement and a transmitter contribution in the first winding is suppressed.

2. A transceiver comprising:

a receiver;

a transmitter;

a transmission and reception arrangement configured for signal transmission and reception;

a first signal transfer element electrically coupling an output of the transmitter to the transmission and reception arrangement, said first signal transfer element configured to pass a transmit signal at a transmission frequency from the transmitter to the signal transmission and reception arrangement and not to pass a receive signal at a reception frequency from the transmission and reception arrangement to the transmitter;

a transformer magnetically coupling an input of the receiver to the transmission and reception arrangement, said transformer comprising a first winding that is electrically in parallel with the first signal transfer element, and a second winding that is magnetically coupled to the first winding and electrically connected to the input of the receiver, to provide a transformer output signal at said input; and wherein said first signal transfer element is further configured to maintain a unity gain for the transmit signal across the first winding of the transformer and thereby prevent the transmit signal from contributing to the transformer output signal, such that the transformer output signal corresponds to the receive signal.

3. The transceiver according to claim 2, wherein the first signal transferring element comprises an amplifier having a gain and phase shift that is matched to a gain and phase shift of the first winding at the transmitter frequency such that a voltage contribution from the transmitter is equal at both sides of the first winding.

4. The transceiver according to claim 3, further comprising a first controller arranged to control the gain or attenuation of the first signal transferring element such that the first signal transferring element and the first winding have equal gain or attenuation impact on transmit signals from the transmitter.

5. The transceiver according to claim 4, further comprising a measurement circuit arranged to measure a signal significant for the transmitter contribution in the first winding, wherein the first controller comprises a feedback circuit arranged to perform the control based on the measured signal.

6. The transceiver according to claim 5, wherein the measurement circuit is arranged to measure the significant signal as a voltage across the first winding.

7. The transceiver according to claim 6, wherein the measurement circuit is arranged to measure the significant signal as transmitter leakage signal at the input of the receiver.

8. The transceiver according to claim 2, wherein the first signal transferring element comprises a filter having an attenuation and phase shift that is matched to an attenuation and phase shift of the first winding at transmitter frequency such that a voltage contribution from the transmitter is equal at both sides of the first winding.

9. The transceiver according to claim 2, wherein the first signal transferring element comprises an isolator having an attenuation and phase shift that is matched to an attenuation and phase shift of the first winding at transmitter frequency such that a voltage contribution from the transmitter is equal at both sides of the first winding.

10. The transceiver according to claim 2, wherein the first signal transferring element and the first winding have equal phase impact on signals from the transmitter.

11. The transceiver according to claim 2, wherein the first winding is in a circuit path connected in parallel to the first signal transferring element, and wherein the circuit path consists of the first winding and a second signal transferring element.

12. The transceiver according to claim 11, further comprising a first controller arranged to control the phase shift of the second signal transferring element such that the first signal transferring element and the circuit path have equal phase impact on signals from the transmitter.

13. The transceiver according to claim 11, wherein the second signal transferring element is a galvanic connection between the first winding and the output of the transmitter.

14. The transceiver according to claim 2, wherein the first signal transferring element is tuneable based on changes in impedance of the signal transmission and reception arrangement.

15. The transceiver according to claim 2, wherein the first signal transfer element is any of a filter, amplifier, isolator and circulator.

16. A communication device that is configured for frequency division duplex communication in a communication network and comprises a transceiver that comprises a transmitter, a receiver, and a transmission and reception arrangement that is arranged to transmit signals provided from the transmitter and arranged to receive signals and provide them to the receiver, and wherein the transceiver further comprises:

a first signal transfer element electrically coupling an output of the transmitter to the transmission and reception arrangement, said first signal transfer element configured to pass a transmit signal at a transmission frequency from the transmitter to the signal transmission and reception arrangement and not to pass a receive signal at a reception frequency from the transmission and reception arrangement to the transmitter;

a transformer magnetically coupling an input of the receiver to the transmission and reception arrangement, said transformer comprising a first winding that is electrically in parallel with the first signal transfer element, and a second winding that is magnetically coupled to the first winding and electrically connected to the input of the receiver, to provide a transformer output signal at said input; and wherein said first signal transfer element is further configured to maintain a unity gain for the transmit signal across the first winding of the transformer and thereby prevent the transmit signal from contributing to the transformer output signal, such that the transformer output signal corresponds to the receive signal.

* * * * *

UNITED STATES PATENT AND TRADEMARK OFFICE
CERTIFICATE OF CORRECTION

PATENT NO. : 9,143,186 B2  
APPLICATION NO. : 13/751939  
DATED : September 22, 2015  
INVENTOR(S) : Andersson et al.

Page 1 of 1

It is certified that error appears in the above-identified patent and that said Letters Patent is hereby corrected as shown below:

In The Specification

In Column 1, Line 42, delete "transmitter 102," and insert -- transmitter 108, --, therefor.

Signed and Sealed this
Tenth Day of May, 2016

Michelle K. Lee
*Director of the United States Patent and Trademark Office*